(12) United States Patent
Kim et al.

(10) Patent No.: US 11,553,391 B2
(45) Date of Patent: *Jan. 10, 2023

(54) WIRELESS COMMUNICATION HANDOVER RESPONSIVE TO UPLINK INTERFERENCE AT A SERVING CELL

(71) Applicant: T-Mobile Innovations LLC, Overland Park, KS (US)

(72) Inventors: Yun Sung Kim, Ashburn, VA (US); Sanghoon Sung, Ashburn, VA (US); Jason Peter Sigg, Overland Park, KS (US); PinalKumari K. Tailor, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,785

(22) Filed: Aug. 20, 2021

(65) Prior Publication Data

US 2021/0385717 A1 Dec. 9, 2021

Related U.S. Application Data

(63) Continuation of application No. 16/793,795, filed on Feb. 18, 2020, now Pat. No. 11,129,073.

(51) Int. Cl.
*H04W 4/00* (2018.01)
*H04W 36/20* (2009.01)
(Continued)

(52) U.S. Cl.
CPC .......... *H04W 36/20* (2013.01); *H04B 17/318* (2015.01); *H04W 36/0058* (2018.08);
(Continued)

(58) Field of Classification Search
CPC ...... H04B 17/00; H04B 17/30; H04B 17/309; H04B 17/318; H04B 17/336;
(Continued)

(56) References Cited

U.S. PATENT DOCUMENTS 8,050,222 B2 11/2011 Maeda et al.
8,644,835 B2 2/2014 Choi et al.
(Continued)

OTHER PUBLICATIONS

"On UL interference in heterogeneous deployments"; Ericsson, ST-Ericsson; Nov. 14-18, 2011; 3 Pages; 3GPP TSG-RAN WG1 Meeting #67; San Francisco, USA.
"Compromised solution of measurement report for aerial UE"; LG Electronics Inc.; Apr. 16-20, 2018; pp. 1-7; 3GPP TSG-RAN WG2#101bis; Sanya, China.

*Primary Examiner* — Matthew W Genack (57) ABSTRACT

In a wireless User Equipment (UE), a serving radio wirelessly exchanges data with a serving cell over a serving radio band. The wireless UE wirelessly receives serving signaling that indicates serving uplink interference for the serving radio band at the serving cell. A neighbor radio in the UE wirelessly receives neighbor signaling. UE circuitry determines serving signal strength and the serving uplink interference for the serving cell. The UE circuitry determines neighbor signal strength for the neighbor cell. The UE circuitry compares the serving uplink interference and the serving signal strength to the neighbor signal strength, and in response, generates a handover request for the neighbor cell. The serving radio wirelessly transfers the handover request to the serving cell, and in response, the neighbor radio wirelessly exchanges additional data with the neighbor cell over the neighbor radio band.

20 Claims, 7 Drawing Sheets

(51) Int. Cl.
*H04B 17/318* (2015.01)
*H04W 36/00* (2009.01)
*H04W 36/08* (2009.01)
*H04W 36/30* (2009.01)

(52) U.S. Cl.
CPC ..... *H04W 36/00835* (2018.08); *H04W 36/08* (2013.01); *H04W 36/30* (2013.01)

(58) Field of Classification Search
CPC ................ H04B 17/345; H04W 36/00; H04W 36/0005; H04W 36/0058; H04W 36/0083; H04W 36/00835; H04W 36/08; H04W 36/20; H04W 36/30
See application file for complete search history.

(56) References Cited

U.S. PATENT DOCUMENTS

| | | |
|---|---|---|
| 8,655,366 B2 | 2/2014 | Kubota |
| 9,661,545 B2 | 5/2017 | Yavuz et al. |
| 2004/0029532 A1 | 2/2004 | Schwarz et al. |
| 2008/0014941 A1 | 1/2008 | Catovic et al. |
| 2008/0232326 A1 | 9/2008 | Lindoff et al. |
| 2009/0047962 A1 | 2/2009 | Rao |
| 2010/0197300 A1 | 8/2010 | Van Der Velde et al. |
| 2010/0311452 A1 | 12/2010 | Li et al. |
| 2013/0094385 A1 | 4/2013 | Gunnarsson et al. |
| 2014/0302853 A1 | 10/2014 | Militano et al. |
| 2015/0172986 A1 | 6/2015 | Salkintzis |
| 2018/0070280 A1 | 3/2018 | Nittala et al. |
| 2020/0229053 A1 | 7/2020 | Pakniat et al. |

WIRELESS COMMUNICATION HANDOVER RESPONSIVE TO UPLINK INTERFERENCE AT A SERVING CELL

RELATED CASES

This United States Patent Application is a continuation of U.S. patent application Ser. No. 16/793,795 that was filed on Feb. 18, 2020 and is entitled "WIRELESS COMMUNICATION HANDOVER RESPONSIVE TO UPLINK INTERFERENCE AT A SERVING CELL." U.S. patent application Ser. No. 16/793,795 is hereby incorporated by reference into this United States Patent Application.

TECHNICAL BACKGROUND

Wireless communication networks provide wireless data services to wireless user devices. The wireless data services include internet-access, media-streaming, machine communications, and the like. Exemplary wireless user devices comprise phones, computers, wearable transceivers, vehicles, robots, and sensors. The wireless communication networks have wireless cells that exchange wireless signals with the wireless user devices over Radio Frequency (RF) bands using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

To enable user mobility for the wireless data services, the wireless communication networks handover the wireless user devices among the wireless cells as the wireless user devices move about. In a typical device handover, a serving cell hands-over the wireless user device to a target cell as the wireless user device moves away from the serving cell and toward the target cell. To initiate the handover, the wireless user device detects when the downlink signal strength from the serving cell falls below a serving threshold and when the downlink signal strength for the target cell rises above a target threshold. In addition to the signal strength values, the wireless user device also uses hysteresis values to mitigate ping-pong effects during the handover.

When assessing the target cell signal, the wireless user device uses offsets in combination with the signal strength and hysteresis values. The offsets indicate a cell-specific value and a frequency-specific value for the target cell. The downlink signal strength defines downlink radio coverage, and the downlink radio coverage may be larger than the uplink radio coverage. The target cell offsets adjust the downlink signal strength value to better correspond to the smaller uplink radio coverage. The smaller uplink radio coverage causes problems for wireless user devices at the cell edge that have a downlink but no uplink. Uplink interference causes sudden and significant uplink coverage loss but may not shrink downlink coverage by the same magnitude.

The uplink/downlink coverage mismatch problem is exacerbated by the use of multiple frequency bands. On an inter-band handover from a serving frequency band to a target frequency band, the serving cell and frequency band may experience significant uplink coverage loss, while the target cell and frequency band do not exhibit uplink coverage loss. Unfortunately, the wireless user device and the serving cell do not efficiently and effectively process uplink interference at the serving cell during inter-band handovers.

TECHNICAL OVERVIEW

In a wireless User Equipment (UE), a serving radio wirelessly exchanges data with a serving cell over a serving radio band. The wireless UE wirelessly receives serving signaling that indicates serving uplink interference for the serving radio band at the serving cell. A neighbor radio in the UE wirelessly receives neighbor signaling. UE circuitry determines serving signal strength and the serving uplink interference for the serving cell. The UE circuitry determines neighbor signal strength for the neighbor cell. The UE circuitry compares the serving uplink interference and the serving signal strength to the neighbor signal strength, and in response, generates a handover request for the neighbor cell. The serving radio wirelessly transfers the handover request to the serving cell, and in response, the neighbor radio wirelessly exchanges additional data with the neighbor cell over the neighbor radio band.

DETAILED DESCRIPTION

Figure 1:
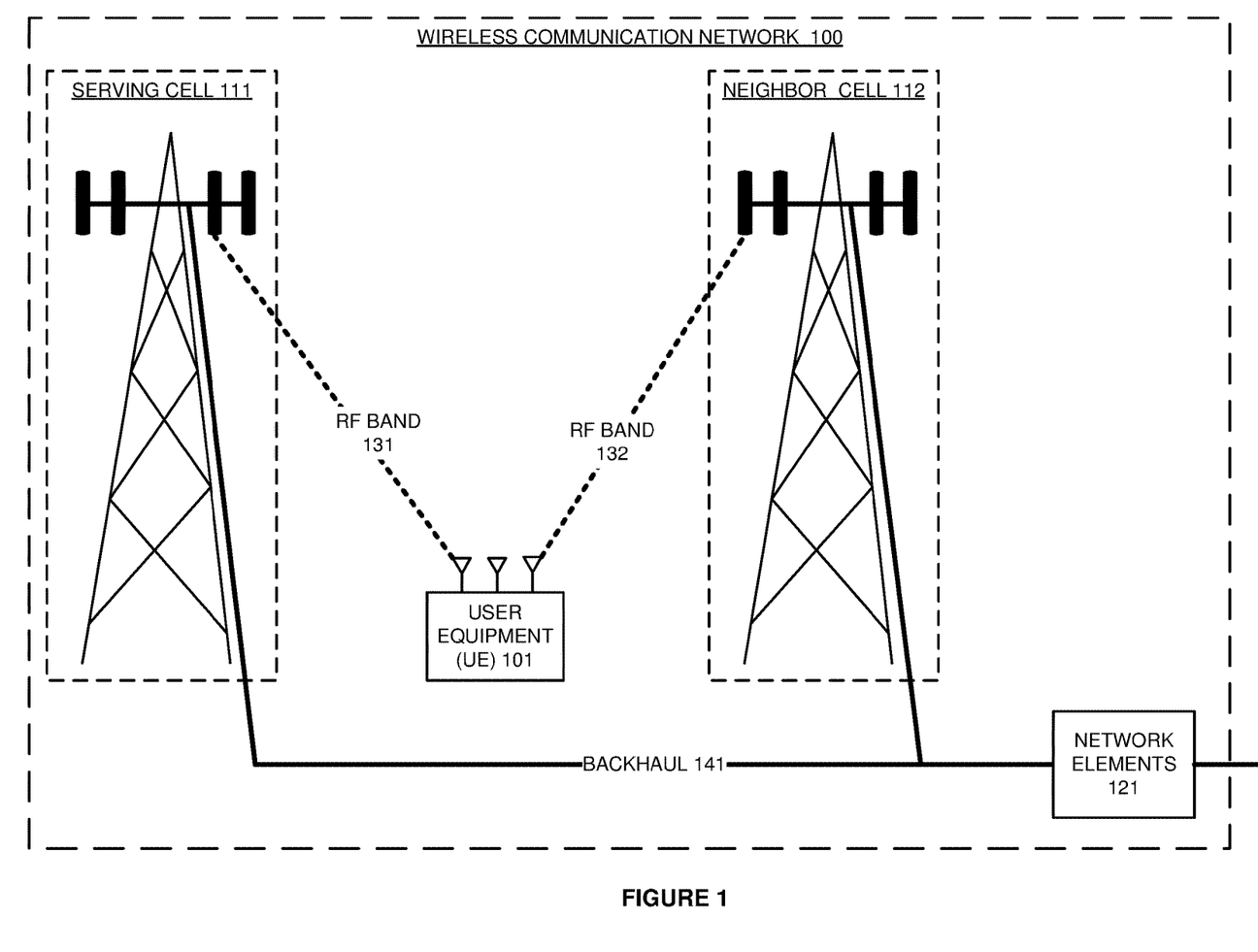
FIG. 1 illustrates a wireless communication network to handover wireless User Equipment (UE) in response to Uplink (UL) interference at a serving cell.

FIG. 1 illustrates wireless communication network 100 to handover wireless User Equipment (UE) 101 in response to Uplink (UL) interference at serving cell 111. Wireless communication network 100 supports wireless data services like internet-access, media-streaming, messaging, gaming, machine-communications, and/or some other wireless data product. Wireless communication network 100 comprises wireless UE 101, serving cell 111, neighbor cell 112, and network elements 121.

Before the handover, wireless UE 101 and serving cell 111 are coupled over Radio Frequency (RF) band 131. After the handover, wireless UE 101 and neighbor cell 112 are coupled over RF band 132. RF bands 131-132 use different frequency blocks and do not share electromagnetic spectrum. Thus, the handover represents an inter-band handover for wireless UE 101 between RF bands 131-132. RF bands 131-132 use frequency blocks in the low-band, mid-band, high-band, or some other part or the wireless electromagnetic spectrum. RF bands 131-132 transport wireless communication protocols like Fifth Generation New Radio (5GNR), Long Term Evolution (LTE), Low-Power Wide Area Network (LP-WAN), Institute of Electrical and Electronic Engineers (IEEE) 802.11 (WIFI), or some other wireless networking protocol.

Serving cell 111 and neighbor cell 112 are coupled to one another over backhaul links 141. Serving cell 111 and neighbor cell 112 are also coupled to network elements 121 over backhaul links 141. Backhaul links 141 may use Time Division Multiplex (TDM), IEEE 802.3 (ETHERNET), Internet Protocol (IP), Data Over Cable System Interface Specification (DOCSIS), LTE, 5GNR, virtual switching, radio tunneling protocols, or some other data network protocol.

Wireless UE 101 might be a phone, computer, wearable transceiver, robot, vehicle, or some other data appliance with wireless communication circuitry. Wireless UE 101 comprises radios and user circuitry which are coupled over bus circuitry. The radios comprise antennas, filters, amplifiers, analog-to-digital interfaces, microprocessors, memory, software, transceivers, bus circuitry, and the like. The user circuitry comprises microprocessors, memory, software, transceivers, bus circuitry, and the like. The microprocessors comprise Digital Signal Processors (DSP), Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems, user applications, and network applications.

Serving cell 111 and neighbor cell 112 comprise radios and Baseband Units (BBUs) which are coupled over bus circuitry. The radios comprise antennas, filters, amplifiers, analog-to-digital interfaces, microprocessors, memory, software, transceivers, bus circuitry, and the like. The BBUs comprise microprocessors, memory, software, transceivers, bus circuitry, and the like. The microprocessors comprise DSP, CPUs, GPUs, ASICs, and/or the like. The memories comprise RAM, flash circuitry, disk drives, and/or the like. The memories store software like operating systems and network applications. In some examples, cells 111-112 comprise Evolved Universal Terrestrial Radio Access Network Direct Connectivity (EN-DC) access nodes that use 5GNR and LTE.

Network elements 122 comprise microprocessors, memory, software, and bus interfaces. The microprocessors comprise CPU, GPU, ASIC, and/or the like. The memory comprises RAM, flash circuitry, disk drive, and/or the like. The memory stores software like operating system and network applications. Exemplary network elements 122 include Access and Mobility Management Functions (AMFs), Session Management Functions (SMFs), Mobility Management Entities (MMEs), User Plane Functions (UPFs), Serving Gateways (SGWs), Packet Data Network Gateways (PGWs), and/or the like. In some examples, network elements 121 comprise Virtual Network Functions (VNFs) in a Network Function Virtualization Infrastructure (NFVI).

Before the handover of wireless UE 101 from serving cell 111 to neighbor cell 112, serving cell 111 wirelessly exchanges data with wireless UE 101 over RF band 131. Serving cell 111 determines the UL interference for RF band 131 at serving cell 111. The UL interference comprises unwanted energy in RF Band 131 that is typically caused by the wireless UEs and their serving cells. The UL interference does not typically include signal energy or noise energy, although any measure that varies in relation to UL interference could be used.

Serving cell 111 wirelessly transfers an UL interference offset to wireless UE 101 that indicates the uplink interference for RF band 131 at serving cell 111. Serving cell 111 usually transfers additional offsets to wireless UE 101 as well. The UL interference offset for serving cell 111 may comprise a measurement object specific offset for serving cell 111. The UL interference offset accelerates handovers when UL interference is high at serving cell 111 and decelerates handovers when UL interference is low at serving cell 111.

Wireless UE 101 determines Downlink (DL) signal strength at wireless UE 101 for serving cell 111. Wireless UE 101 also determines DL signal strength at UE 101 for neighbor cell 112. Wireless UE 101 uses the UL interference offset and the DL signal strengths to trigger a handover request to serving cell 111. For example, UE 101 may compare data for serving cell 111 (UL interference, DL signal strength, hysteresis value) to a serving threshold, and when the combination falls below the serving threshold, UE 101 compares data for neighbor cells (DL signal strength, neighbor cell offset, neighbor frequency offset, hysteresis value) to a target threshold. When the data for serving cell 111 falls below the serving threshold, and the data for neighbor cell 112 rises above the target threshold, UE 101 transfers a handover request to serving cell 111 that indicates the DL signal strength at UE 101 for cells 111-112 (and typically data for other neighbor cells).

Serving cell 111 receives the handover request from wireless UE 101 that indicates the DL signal strengths for cells 111-112. Serving cell 111 initiates the handover to neighbor cell 112 responsive to the DL signal strengths, UL interference, and typically other offsets and hysteresis values. After the handover, neighbor cell 112 wirelessly exchanges data with the wireless UE 101 over RF band 132.

In some examples, the serving threshold comprises an A5-1 inter-band handover threshold, and the target threshold comprises an A5-2 inter-band handover threshold. In some examples, the neighbor frequency offset (or neighbor cell offset) is based at least in part on the historical uplink interference at neighbor cell 112 on RF band 132 for the current day, date, and time. The neighbor frequency offset (or cell offset) that indicates the neighbor UL interference may comprise a measurement object specific offset for neighbor cell 112.

Figure 2:
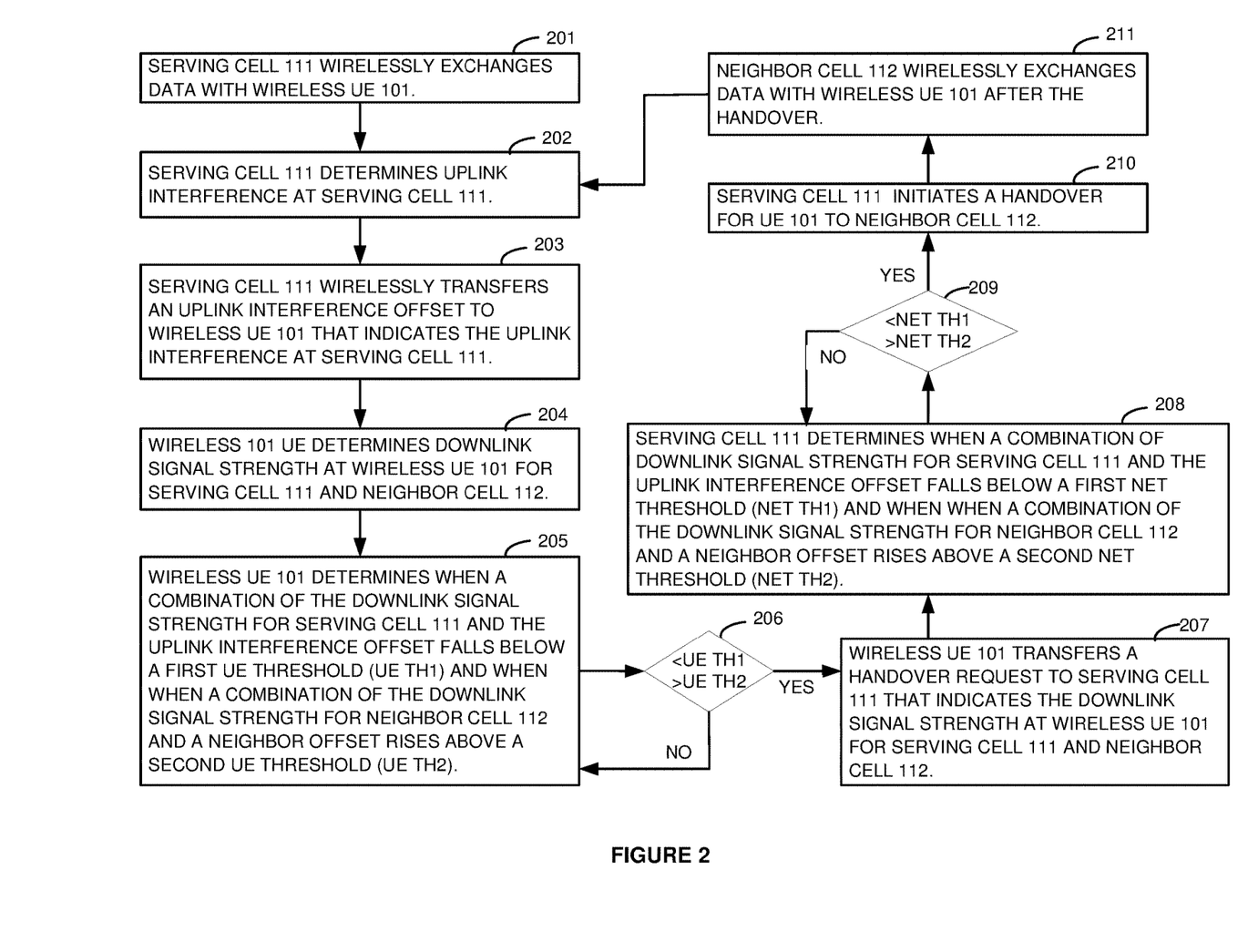
FIG. 2 illustrates the operation of the wireless communication network to handover the wireless UE in response to the UL interference at the serving cell.

FIG. 2 illustrates the operation of wireless communication network 100 to handover wireless UE 101 in response to UL interference at serving cell 111 over RF band 131. Before the handover, wireless UE 101 and serving cell 111 wirelessly exchange data over RF band 131 (201). Serving cell 111 determines the UL interference for RF band 131 at serving cell 111 (202). Serving cell 111 wirelessly transfers an UL interference offset to wireless UE 101 that indicates the uplink interference (203). Wireless UE 101 determines Downlink (DL) signal strength at wireless UE 101 for serving cell 111 and neighbor cell 112 (204). Wireless UE 101 determines when a combination of the DL signal strength and UL interference for serving cell 111 falls below a first UE threshold—UE TH1 (205). Wireless UE 101 also determines when a combination of DL signal strength and offsets for neighbor cell 112 rises above a second UE threshold—UE TH2 (205). When both the combination of the DL signal strength and UL interference for serving cell 111 falls below the first UE threshold and the combination of the DL signal strength and neighbor offsets for neighbor cell 112 rises above the second UE threshold (206), wireless UE 101 transfers a handover request to serving cell 111 with the DL signal strength at UE 101 for serving cell 111 and neighbor cell 112 (207).

Serving cell 111 determines when a combination of the DL signal strength and UL interference for serving cell 111 falls below a first network threshold—NET TH1 (208). Serving cell 208 also determines when a combination of DL signal strength and neighbor offsets for neighbor cell 112 rises above a second network threshold—NET TH2 (208). When the combination of the DL signal strength and UL interference for serving cell 111 falls below the first NET threshold, and the combination of the DL signal strength and neighbor offsets for neighbor cell 112 rises above the second NET threshold (209), serving cell 111 initiates the handover for UE 101 to neighbor cell 112 (210). After the handover, neighbor cell 112 wirelessly exchanges data with the wireless UE 101 over RF band 132 (211). The process then repeats (202) with neighbor cell 112 being the new serving cell and serving cell 111 being a new neighbor cell.

Figure 3:
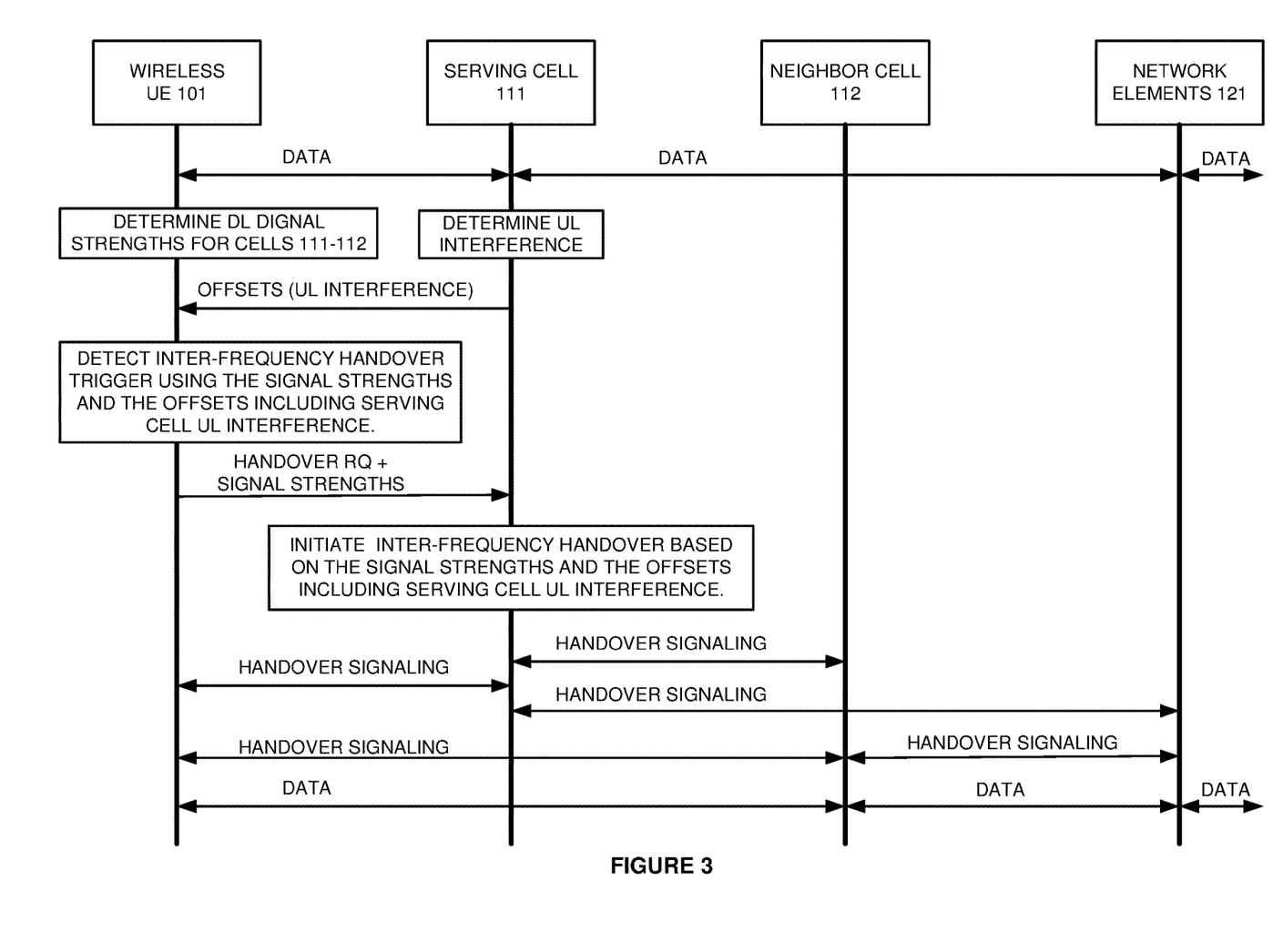
FIG. 3 illustrates the operation of the wireless communication network to handover the wireless UE in response to the UL interference at the serving cell.

FIG. 3 illustrates the operation of wireless communication network 100 to handover wireless UE 101 in response to the UL interference at serving cell 111. Wireless UE 101 and serving cell 111 wirelessly exchange data over RF band 131. Serving cell 111 and network elements 121 exchange the data. Network elements 121 and other data systems exchange the data. Serving cell 111 determines UL interference and wirelessly transfers offsets to wireless UE 101. One of the offsets indicates the recently-determined UL interference at serving cell 111. Wireless UE 101 determines DL signal strength at UE 101 for serving cell 111 and neighbor cell 112. Wireless UE 101 detects an inter-frequency handover trigger by using the DL signal strength at UE 101 for cells 111-112 and the offsets—including the UL interference offset for serving cell 111. Hysteresis values may also be used. In response to the inter-frequency handover trigger, wireless UE 101 transfers a handover request to serving cell 111 that indicates the DL signal strength at UE 101 for serving cell 111 and neighbor cell 112.

Serving cell 111 initiates a handover for UE 101 to neighbor cell 112 based on the signal strengths and the offsets—including UL interference for serving cell 111. To perform the handover, serving cell 111 exchanges handover signaling with neighbor cell 112, UE 101, and network elements 121. Neighbor cell 111 then exchanges handover signaling with UE 101 and network elements 121. In response to the handover signaling, wireless UE 101 and neighbor cell 112 wirelessly exchange data over RF band 132. Neighbor cell 112 and network elements 121 exchange the data, and network elements 121 exchange the data with other data systems.

Advantageously, serving cell 111 and UE 101 efficiently use uplink interference at serving cell 111 when triggering an inter-band handover to neighbor cell 112. UE 101 effectively escapes bad UL coverage at serving cell 111 to obtain better UL coverage at neighbor cell 112. UE 101 also improves DL signal strength through the handover from serving cell 111 to neighbor cell 112.

Figure 4:
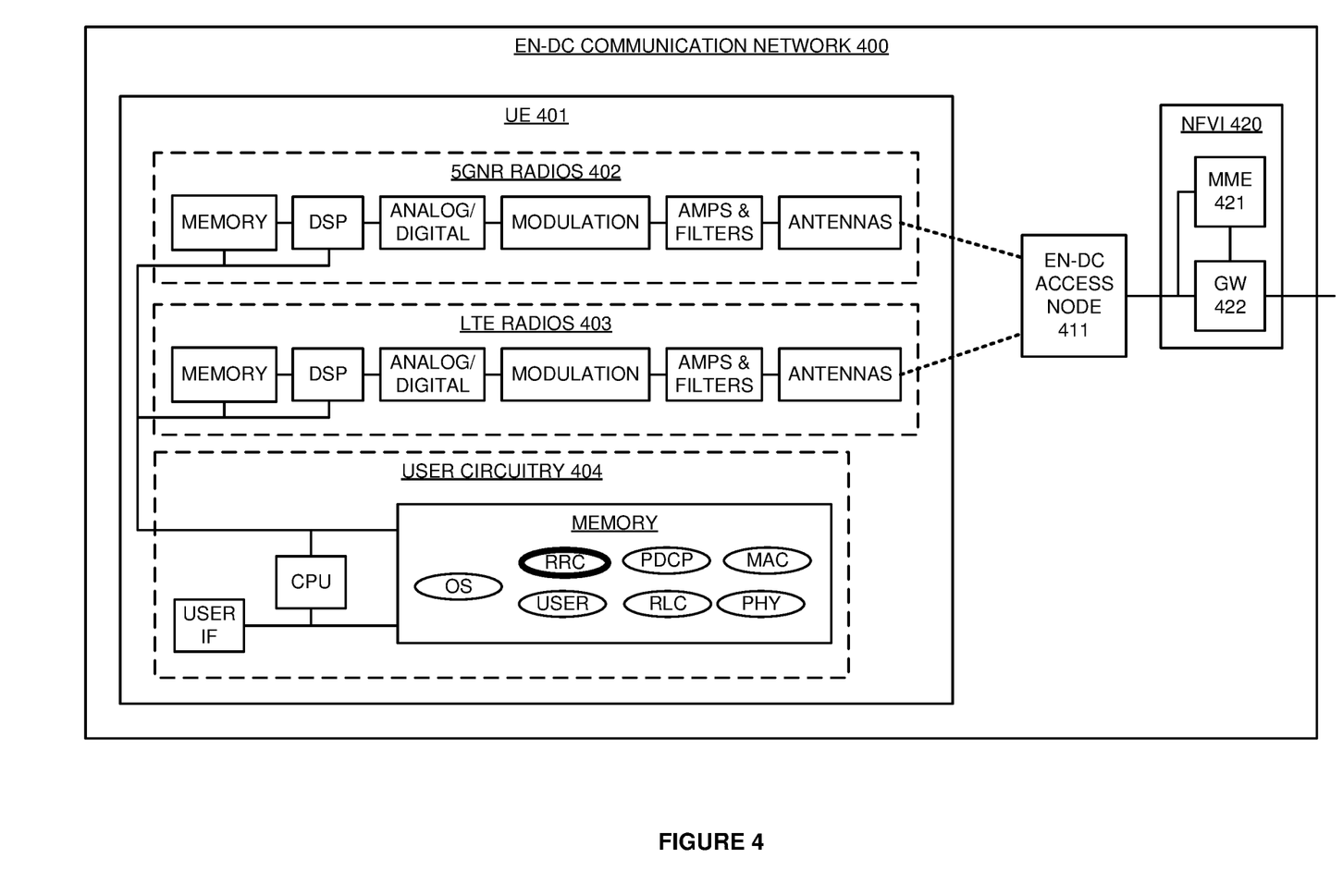
FIG. 4 illustrates a UE that triggers a handover in response to UL interference.

FIG. 4 illustrates wireless UE 401 that triggers a handover in response to UL interference at serving Evolved Universal Terrestrial Radio Access Network Direct Connectivity (EN-DC) access node 411 in EN-DC communication network 400. UE 401 is an example of wireless UE 101, although UE 101 may differ. EN-DC communication network 400 comprises UE 401, EN-DC access node 411, and Network Function Virtualization Infrastructure (NFVI) 420. NFVI 420 includes Mobility Management Entity (MME) 421 and System Evolution Architecture (SAE) Gateway (GW) 422.

UE 401 comprises 5GNR radios 402, LTE radios 403, and user circuitry 404 which are interconnected over bus circuitry. Radios 402-403 comprise antennas, amplifiers, filters, modulation, analog-to-digital interfaces, DSP, and memory that are coupled over bus circuitry. The antennas in UE 401 are wirelessly coupled to EN-DC access node 411 over one or more radio bands. User circuitry 404 comprises user interfaces (IF), CPU, and memory. The memory in user circuitry 404 stores an operating system, user applications, and network applications for PHY, MAC, RLC, PDCP, and RRC. The CPU executes the operating system, user applications, and network applications to exchange signaling and data between the user applications and the RRC and PDCP. The CPU executes the operating system and network applications to wirelessly exchange corresponding signaling and data with EN-DC access node 411 over radios 402-403.

In radios 402-403, the antennas receive wireless signals from EN-DC access node 411 that transport DL signaling and DL data. The antennas transfer corresponding electrical DL signals through duplexers to the amplifiers. The amplifiers boost the received DL signals for filters which attenuate unwanted energy. In modulation, demodulators down-convert the DL signals from their frequency bands. The analog/digital interfaces convert the analog DL signals into digital DL signals for the DSPs. The DSPs recover DL symbols from the DL digital signals. The CPU executes the network applications to process the DL symbols and recover the DL signaling and DL data. The RRC transfers corresponding DL user signaling to the operating system/user applications. The PDCP transfers corresponding DL user data to the operating system/user applications.

The PDCP receives UL user data from the operating system/user applications. The RRC receives UL signaling from the operating system/user applications. The RRC processes the UL signaling and the DL signaling to generate new DL signaling and new UL signaling. The network applications process the UL signaling and the UL data to generate corresponding UL symbols. In radios 402-403, the DSPs process the UL symbols to generate corresponding digital signals for the analog-to-digital interfaces. The analog-to-digital interfaces convert the digital UL signals into analog UL signals for modulation. Modulation up-converts the UL signals to their frequency bands. The amplifiers boost the modulated UL signals for the filters which attenuate unwanted out-of-band energy. The filters transfer the filtered UL signals through duplexers to the antennas. The electrical UL signals drive the antennas to emit corresponding wireless signals that transport the UL signaling and UL data to EN-DC access node 411.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Before a handover from EN-DC access node 411 to a target access node (not shown), the RRC in UE 401 receives measurement object specific offsets from EN-DC access node 411. The offsets include a serving cell offset for EN-DC access node 411, neighbor cell offsets for neighbor access nodes, and neighbor frequency offsets for the neighbor access nodes. The serving cell offset represents and/or indicates the UL interference at EN-DC access node 411 for the radio band used by UE 401. Thus, the serving cell offset accelerates handovers when UL interference is high and decelerates handovers when the UL interference is low.

In UE 401, the PHY determines DL signal strengths for EN-DC access node 411 and for the neighbor access nodes—typically during channel estimation. The PHY notifies the RRC of the DL signal strengths. The RRC processes the DL signal strengths, offsets, and hysteresis values to trigger a handover to one of the neighbor access nodes—the target access node. In particular, the RRC determines when a sum of the DL signal strength for EN-DC access node 411, the serving cell offset (maybe a negative value), and a hysteresis value fall below an A5-1 threshold. When the A5-1 threshold triggers, the RRC determines when a sum of the DL signal strength, the neighbor cell offset, the neighbor frequency offset, and a hysteresis value exceed an A5-2 threshold for the target access node. When the A5-2 threshold triggers, the RRC transfers the handover request to EN-DC access node 411. The handover request indicates the DL signal strength at UE 401 for EN-DC access node 411, the target access node, and some of the other neighbor access nodes. The RRC exchanges handover signaling with EN-DC access node 411 and with the target access node to perform the handover. After the handover, the RRC, PDCP, RLC, MAC, and PHY exchange data and signaling with the target access node.

Figure 5:
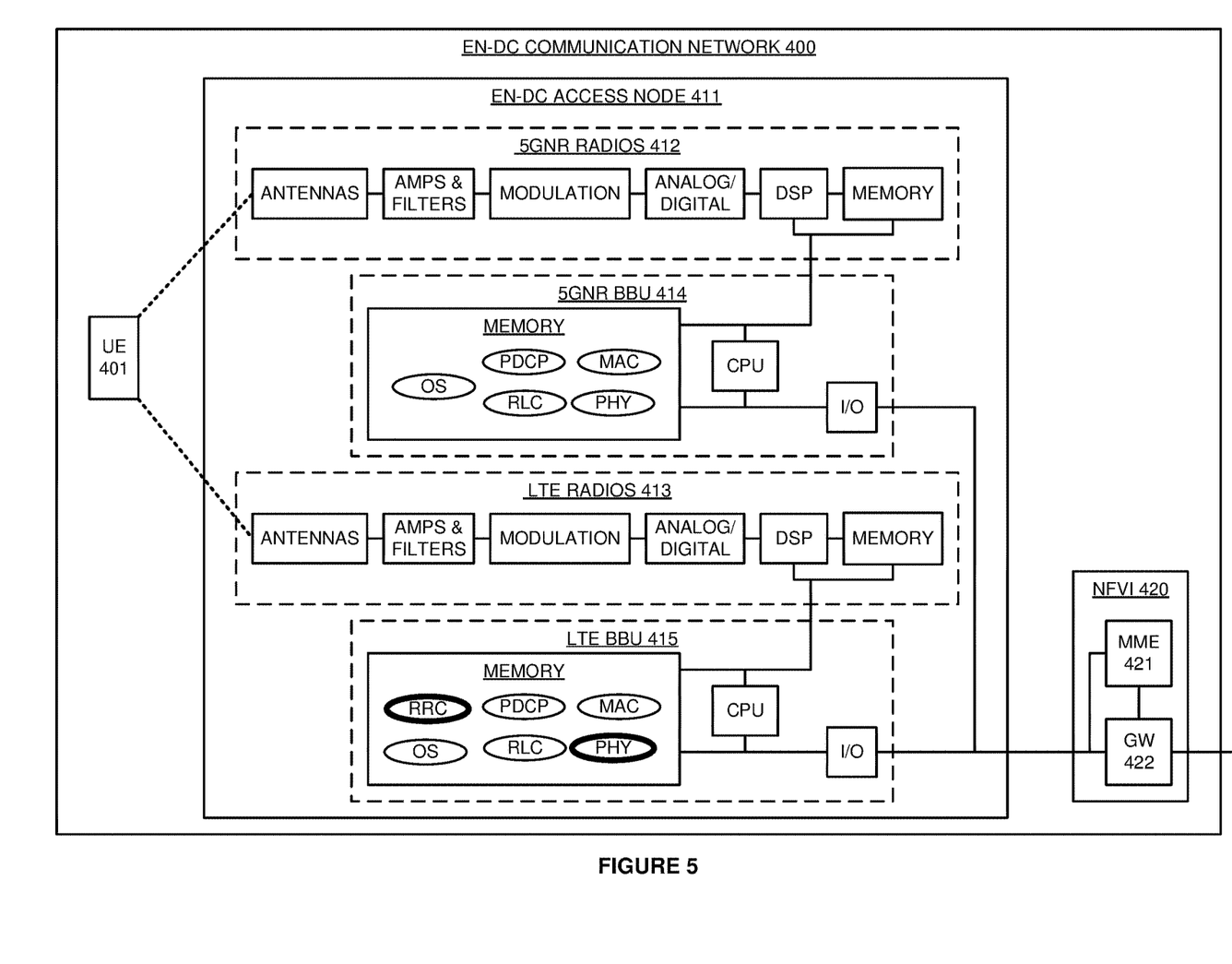
FIG. 5 illustrates an Evolved Universal Terrestrial Radio Access Network Direct Connectivity (EN-DC) access node that hands-over the wireless UE in response to the UL interference.

FIG. 5 illustrates EN-DC access node 411 to handover wireless UE 401 in response to UL interference. EN-DC access node 411 is an example of cells 111-112, although cells 111-112 may differ. EN-DC access node 411 comprises 5GNR radios 412, LTE radios 413, 5GNR Baseband Unit (BBU) 414, and LTE BBU 415. Radios 412-413 comprise antennas, amplifiers, filters, modulation, analog-to-digital interfaces, DSP, and memory that are coupled over bus circuitry. BBUs 414-415 comprises memory, CPU, and data Input/Output (I/O) that are coupled over bus circuitry.

UE 401 is wirelessly coupled to the antennas in radios 412-413. Radios 412-413 and BBUs 414-415 are coupled over data links like Common Public Radio Interface (CPRI) or some other network protocol. The data I/Os in BBUs 414-415 are coupled over backhaul links to MME 421 and SAE GW 422 in NFVI 420. In BBUs 414-415, the memories store operating systems (OS), Physical Layers (PHY), Media Access Controls (MAC), Radio Link Controls (RLC), Packet Data Convergence Protocols (PDCP), and Radio Resource Controls (RRC). The CPU executes the PHY, MAC, RLC, PDCP, and RRC to drive the exchange of data and signaling between UE 401 and NFVI 420 over radios 412-413.

In radios 412-413, the antennas receive wireless signals from UE 401 that transport UL signaling and UL data. The antennas transfer corresponding electrical UL signals through duplexers to the amplifiers. The amplifiers boost the received UL signals for filters which attenuate unwanted energy. In modulation, demodulators down-convert the UL signals from the their frequency bands. The analog/digital interfaces convert the analog UL signals into digital UL signals for the DSP. The DSP recovers UL symbols from the UL digital signals. In BBUs 414-415, the CPUs execute the network applications to process the UL symbols and recover UL LTE signaling, UL LTE data, and UL 5GNR data. In LTE BBU 415, the CPU executes the RRC to process the UL LTE signaling and DL LTE signaling to generate new UL LTE signaling and new DL LTE signaling. The RRC transfers the new UL LTE signaling to MME 421 in NFVI 420 over the data I/O and backhaul links. The PDCP transfers the UL LTE data to SAE GW 422 over the data I/O and backhaul links. In 5GNR BBU 414, the PDCP transfers the UL 5GNR data to SAE GW 422 over the data I/O and backhaul links.

In LTE BBU 415, the RRC receives DL LTE signaling from MME 421, and the PDCP receives DL LTE data from SAE GW 422 over the data I/O and the backhaul links. The CPU executes the network applications to process the DL LTE signaling, DL LTE data to generate corresponding DL symbols that represent the DL signaling and DL data in the frequency domain. In 5GNR BBU 414, the PDCP receives DL 5GNR data from SAE GW 422 over the data I/O and the backhaul links. The CPU executes the network applications to process the DL 5GNR data to generate corresponding DL symbols that represent the DL data in the frequency domain.

In radios 412-413, the DSP processes the DL symbols to generate corresponding digital signals for the analog-to-digital interfaces. The analog-to-digital interfaces convert the digital DL signals into analog DL signals for modulation. Modulation up-converts the DL signals to their frequency bands. The amplifiers boost the modulated DL signals for the filters which attenuate unwanted out-of-band energy. The filters transfer the filtered DL signals through duplexers to the antennas. The electrical DL signals drive the antennas to emit corresponding wireless signals that transport the DL signaling and DL data to UE 401.

RRC functions comprise authentication, security, handover control, status reporting, QoS, network broadcasts and pages, and network selection. PDCP functions comprise LTE/5GNR allocations, security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

For handovers of wireless UE 401 from EN-DC access node 411 to target access nodes, the PHYs determine UL interference power during channel estimation for the radio band used by UE 401. The PHYs signal the UL interference power level to the RRC. In LTE BBU 415, the RRC generates a serving cell offset that indicates the UL interference measured by the PHYs for the radio band. The serving cell offset is typically a negative decibel value. The RRC transfers measurement object specific offsets (serving cell offset, neighbor cell offsets, and neighbor frequency offsets) to the RRC in UE 401.

Advantageously, the serving cell offset represents and/or indicates the UL interference at EN-DC access node 411. The serving cell offset accelerates handovers when UL interference is high and decelerates handovers when UL interference is low. In LTE BBU 415, the RRC receives a handover request from UE 401 that indicates the DL signal strength at UE 401 for EN-DC access node 411 and at least one neighbor access node. The RRC verifies that the sum of the DL signal strength for EN-DC access node 411, the serving cell offset, and the hysteresis value fall below the A5-1 threshold and that the sum of the DL signal strength for the target neighbor access node, the neighbor cell offset, the neighbor frequency offset, and the hysteresis value exceed the A5-2 threshold. When the A5 handover triggers are verified, the RRC transfers handover signaling to the target access node, UE 401, and MME 421. After the handovers, EN-DC access node 411 does not exchange data with UE 401 (until UE 401 may subsequently reattach to access node 401).

On handovers of UE 401 from a serving access node (not shown) to EN-DC access node 411, the RRC in LTE BBU 415 receives handover signaling from the serving access node for UE 401. In response, the RRC transfers handover signaling to the serving access node, UE 401, and MME 421. After the handover, the RRC, PDCP, RLC, MAC, and PHY exchange data and signaling with UE 401 over radios 412-413. The RRC and PDCP exchange corresponding signaling and data with MME 421 and SAE GW 422 over backhaul links.

In some examples, the RRC in LTE BBU 415 averages the UL interference power over time to generate average UL interference values at EN-DC access node 411 over the radio bands for various days, date, and times. The RRC then processes the historical UL interference averages for the current day, date, time, and radio band to generate a neighbor frequency offset that is based on the historical UL interference power for the time, day, and date for the radio band. The RRC transfers the neighbor frequency offsets for the radio bands of EN-DC access node 411 to the neighbor access nodes. The neighbor access nodes transfer the neighbor frequency offsets for their radio bands to their served UEs. The UEs use the neighbor cell offsets to trigger handovers to EN-DC access node 411 based on historical UL interference at EN-DC access node 411. The UEs may also use serving cell offsets that indicate actual UL interference at the serving access node. The neighbor frequency offset decelerates handovers when historical UL interference is high and accelerates handovers when historical UL interference is low.

Figure 6:
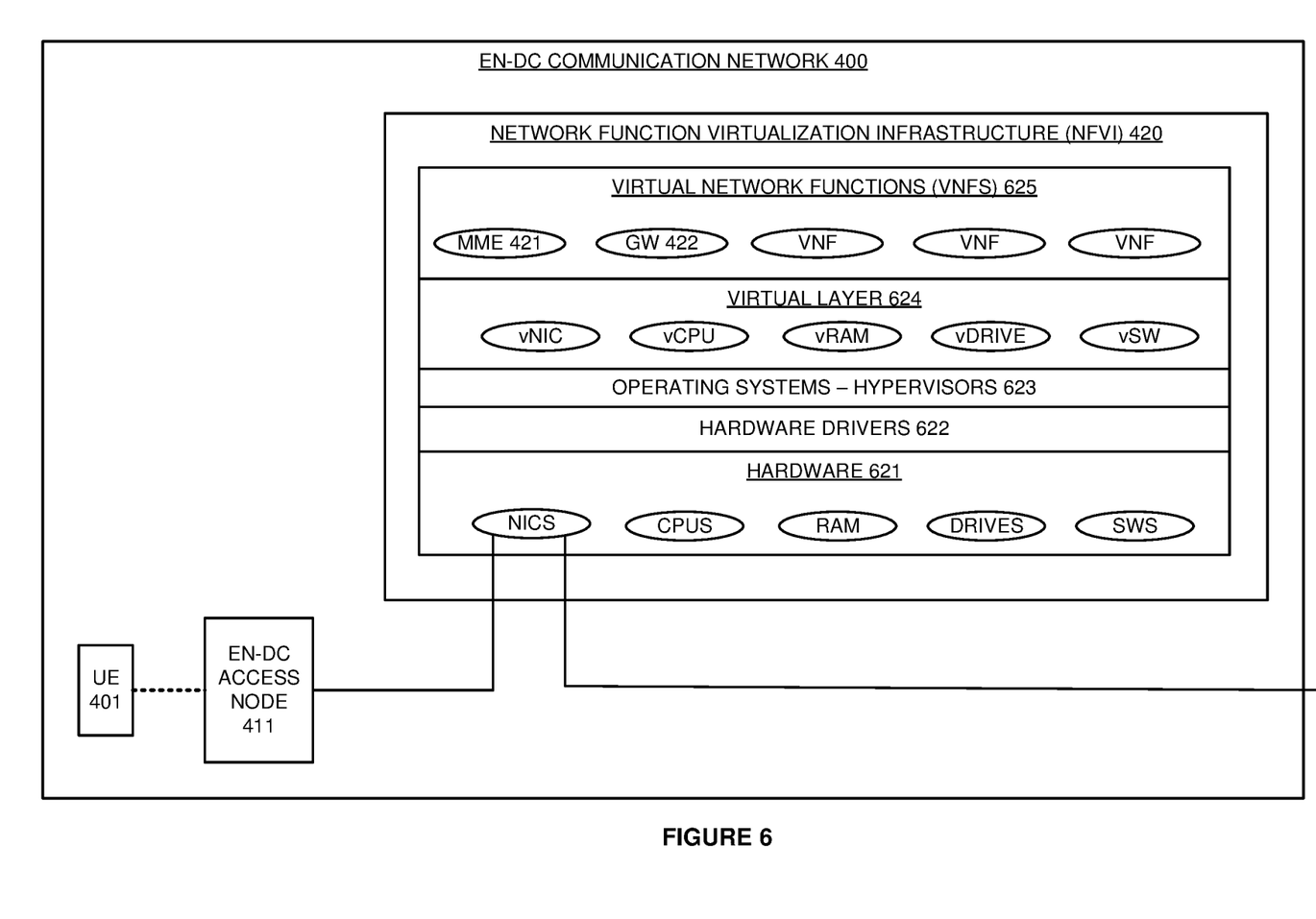
FIG. 6 illustrates a Network Function Virtualization Infrastructure (NFVI) to support the handover of the UE in response to the UL interference.

FIG. 6 illustrates Network Function Virtualization Infrastructure (NFVI) 420 to support the handover of UE 401 in response to UL interference at the serving EN-DC access node 411. NFVI 420 is an example of network elements 121, although network elements 121 may differ. NFVI 420 comprises hardware 621, hardware drivers 622, operating systems and hypervisors 623, virtual layer 624, and Virtual Network Functions (VNFs) 625. Hardware 621 comprises Network Interface Cards (NICs), CPUs, RAM, flash/disk drives, and data switches (SWS). Virtual layer 624 comprises virtual NICs (vNIC), virtual CPUs (vCPU), virtual RAM (vRAM), virtual Drives (vDRIVE), and virtual Switches (vSW). The NICs in NFVI 420 are coupled to EN-DC access node 411 and neighbor access nodes over backhaul links. VNFs 425 comprise MME 421, SAE GW 422, and other VNFs. Hardware 621 executes hardware drivers 622, operating systems and hypervisors 623, virtual layer 624, and VNFs 625 to serve UE 401 with data services over EN-DC access node 411.

MME 421 receives handover signaling for UE 401 from the serving access node (EN-DC access node 411 or one of its neighbor access nodes). In response, MME 421 signals SAE GW 422 to terminate the existing data bearer for UE 401 through the serving access node. MME 421 signals the serving access node to terminate the data bearer for UE 401 and to direct UE 401 to attach to the target access node. In response, MME 421 signals SAE GW 422 and the target access node to add a new data bearer for UE 401 through the target access node (EN-DC access node 411 or one of its neighbor access nodes).

Figure 7:
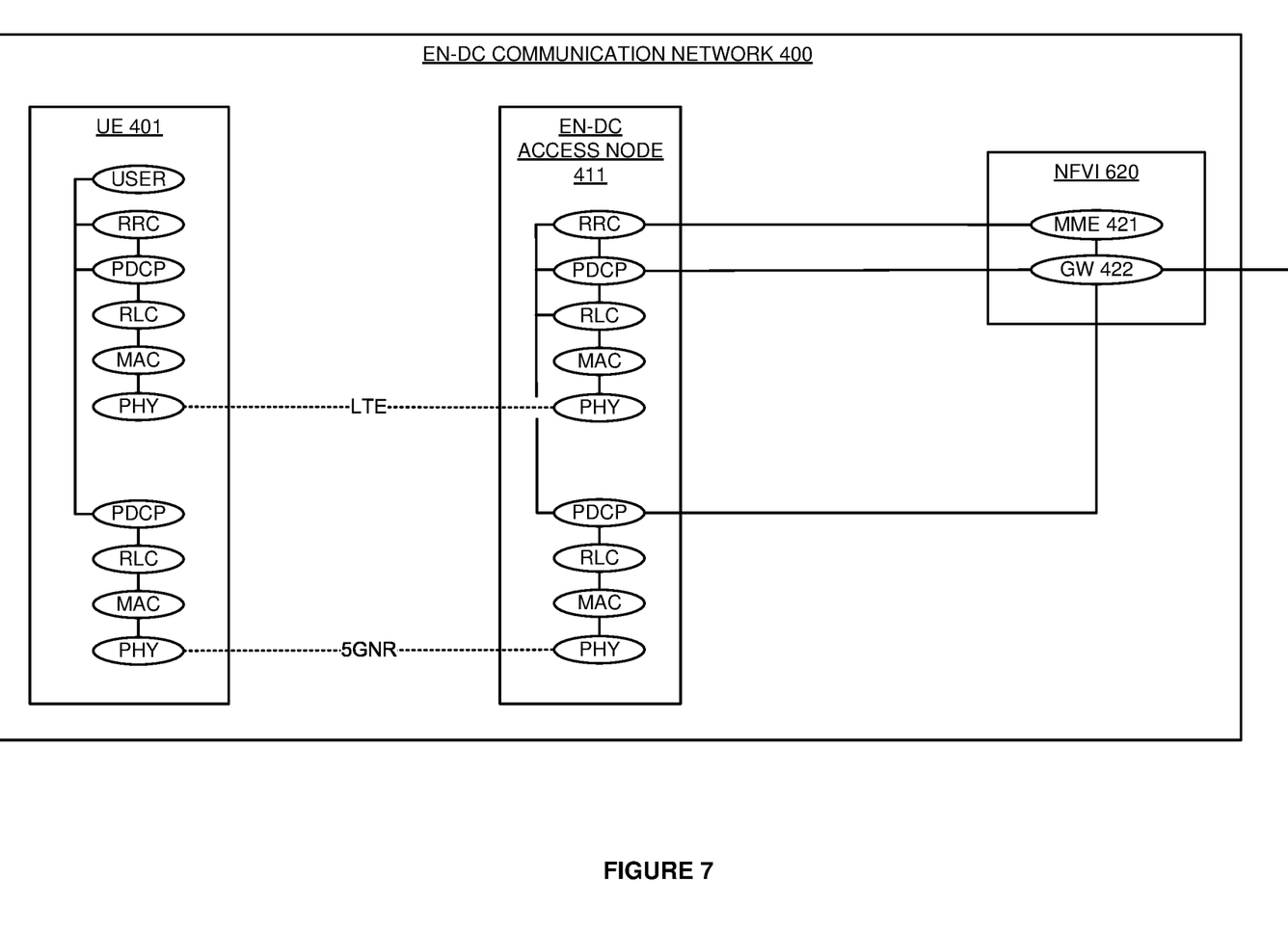
FIG. 7 illustrates the operation of an EN-DC communication network to handover a wireless UE in response to the UL interference.

FIG. 7 illustrates the operation of EN-DC communication network 400 to handover UE 401 in response to UL interference at EN-DC access node 411. On a handover of UE 401 from EN-DC access node 411 to a target, the PHYs in node 411 determine UL interference power during channel estimation for the radio band used by UE 401. The PHYs signal the UL interference power level to the RRC. The RRC generates a serving cell offset that indicates the UL interference power on the radio band used by the UE. The RRC in EN-DC access node 411 transfers the serving cell offset, neighbor cell offsets, and neighbor frequency offsets to the RRC in UE 401. The neighbor frequency offsets may represent historical UL interference at the neighbor access nodes for the current day, date, time, and band. In UE 401, the RRC receives the offsets from EN-DC access node 411. The PHYs in UE 401 determine DL signal strength over the radio bands used by EN-DC access node 411 and the neighbor access nodes—typically during channel estimation. The PHYs notify the RRC in UE 401 of the DL signal strengths. The RRC in UE 401 determines when a sum of the DL signal strength at UE 401 for EN-DC access node 411, the serving cell offset for the band, and a hysteresis value falls below an A5-1 threshold. When the A5-1 threshold triggers, the RRC in UE 401 determines when a sum of the DL signal strength for the target, the neighbor cell offset, the neighbor frequency offset, and a hysteresis value exceed an A5-2 threshold. When the A5-2 threshold triggers, the RRC transfers the handover request to EN-DC access node 411. The handover request indicates the DL signal strength at UE 401 for EN-DC access node 411, the target access node, and some of the other neighbor access nodes. In EN-DC access node 411, the RRC receives the handover request from UE 401. The RRC verifies A5-1 and A5-2 triggers. When the A5-1 and A5-2 triggers are verified, the RRC transfers handover signaling to the RRC in the target access node and to MME 421 in NFVI 420. MME 421 signals SAE GW 422 to terminate the existing data bearers for UE 401 through EN-DC access node 411. MME 421 signals the RRC in EN-DC access node 411 to terminate the data bearers for UE 401. MME 421 signals the RRC in EN-DC access node 411 to direct UE 401 to attach to the target access node, and the RRC in in EN-DC access node 411 signals UE 401 to attach to the target access node. The RRC in UE 401 attaches to the target access node. EN-DC access node 411 forwards downlink data to the target access node. MME 421 signals SAE GW 422 and the RRC in the target access node to add new data bearers for UE 401. UE 401 then exchanges data with SAE GW 422 over the target access node instead of EN-DC access node 411. SAE GW 422 exchanges the data with other data systems to deliver the data service.

For a handover of UE 401 from a source to EN-DC access node 411, the PHYs in node 411 determine UL interference power during channel estimation for the radio band used by UE 401. The PHYs signal the UL interference power levels to the RRC. The RRC generates a neighbor frequency offset for the radio band based on the historical UL interference data for the current day, date, and time. The RRC in EN-DC access node 411 transfers the neighbor cell offset to the RRCs in the neighbor access nodes. The RRCs in the neighbor access nodes transfer the neighbor offset for the radio band to UE 401. The PHYs in UE 401 determine DL signal strength for the serving access node, EN-DC access node 411, and other neighbor access nodes—typically during channel estimation. The PHYs notify the RRC in UE 401 of the DL signal strengths. The RRC in UE 401 determines when a sum of the DL signal strength for the serving access node, the serving cell offset (which is based on actual UL interference at the serving access node), and a hysteresis value fall below the A5-1 threshold. When the A5-1 threshold triggers, the RRC in UE 401 determines when a sum of the DL signal strength for the EN-DC access node 411, the neighbor cell offset, the neighbor frequency offset (which is based on historical UL interference at EN-DC access node 411 for the radio band), and a hysteresis value exceed an A5-2 threshold. When the A5-2 threshold triggers, the RRC transfers the handover request to the serving access node. The handover request indicates the DL signal strength at UE 401 for the serving access node, EN-DC access node 411, and some of the other neighbor access nodes. The serving access node verifies the A5 triggers transfers handover signaling to the RRC in EN-DC access node 411 and to MME 421 in NFVI 420. MME 421 signals SAE GW 422 to terminate the existing data bearers for UE 401 through the serving access node. MME 421 signals the RRC in the serving access node to terminate the data bearers for UE 401. MME 421 signals the RRC in the serving access node to direct UE 401 to attach to EN-DC access node 411, and the RRC in the target access node signals UE 401 to attach to EN-DC access node 411. The RRC in UE 401 attaches to EN-DC access node 411. The target access node forwards downlink data to EN-DC access node 411. MME 421 signals SAE GW 422 and the RRC in EN-DC access node 411 to add new data bearers for UE 401. UE 401 then exchanges data with SAE GW 422 over EN-DC access node 411 instead of the target access node. SAE GW 422 exchanges the data with other data systems to deliver the data service.

The wireless data network circuitry described above comprises computer hardware and software that form special-purpose network circuitry to handover wireless UEs between wireless access nodes responsive to uplink interference power. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to handover wireless UEs between wireless access nodes responsive to uplink interference power.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless User Equipment (UE) to initiate a handover from a serving cell to a neighbor cell in a wireless communication network, the method comprising:

a serving radio wirelessly exchanging data with the serving cell over a serving radio band, exchanging the data with UE circuitry, wirelessly receiving serving signaling that indicates serving uplink interference for the serving radio band at the serving cell, and transferring the serving signaling to the UE circuitry;

a neighbor radio wirelessly receiving neighbor signaling and transferring the neighbor signaling to the UE circuitry;

the UE circuitry exchanging the data with the serving radio, receiving the serving signaling from the serving radio, receiving the neighbor signaling from the neighbor radio, determining serving signal strength and the serving uplink interference for the serving radio band at the serving cell, determining neighbor signal strength for the neighbor radio band at the neighbor cell, comparing the serving uplink interference and the serving signal strength to the neighbor signal strength, and in response, generating a handover request for the neighbor cell;

the serving radio wirelessly transferring the handover request to the serving cell; and the neighbor radio wirelessly exchanging additional data with the neighbor cell over the neighbor radio band.

2. The method of claim 1 wherein:

the serving radio wirelessly receiving the serving signaling that indicates the serving uplink interference for the serving radio band at the serving cell comprises receiving a serving interference offset that indicates the serving uplink interference for the serving radio band at the serving cell; and the UE circuitry comparing the serving uplink interference and the serving signal strength to the neighbor signal strength comprises combining the serving signal strength and the serving interference offset and comparing the combination to the neighbor signal strength.

3. The method of claim 1 wherein:

the neighbor radio wirelessly receiving the neighbor signaling comprises receiving a neighbor interference offset that indicates neighbor uplink interference for the neighbor radio band at the neighbor cell; and the UE circuitry comparing the serving uplink interference and the serving signal strength to the neighbor signal strength comprises combining the neighbor signal strength and the neighbor interference offset and comparing the combination to the serving uplink interference and the serving signal strength.

4. The method of claim 1 wherein:
the serving radio wirelessly receiving the serving signaling that indicates the serving uplink interference for the serving radio band at the serving cell comprises receiving a serving interference offset that indicates the serving uplink interference for the serving radio band at the serving cell;
the neighbor radio wirelessly receiving the neighbor signaling comprises receiving a neighbor interference offset that indicates neighbor uplink interference for the neighbor radio band at the neighbor cell; and
the UE circuitry comparing the serving uplink interference and the serving signal strength to the neighbor signal strength comprises combining the serving signal strength with the serving interference offset, combining the neighbor signal strength with the neighbor interference offset, and comparing the combinations.

5. The method of claim 1 wherein the UE circuitry comparing the serving uplink interference and the serving signal strength to the neighbor signal strength comprises applying a Fifth Generation New Radio (5GNR) A5-1 threshold.

6. The method of claim 1 wherein the UE circuitry comparing the serving uplink interference and the serving signal strength to the neighbor signal strength comprises applying a Long Term Evolution (LTE) A5-1 threshold.

7. The method of claim 1 wherein the UE circuitry comparing the serving uplink interference and the serving signal strength to the neighbor signal strength comprises comparing the serving uplink interference and the serving signal strength to the neighbor signal strength in response to a serving measurement object for the serving radio band at the serving cell.

8. The method of claim 1 wherein the UE circuitry comparing the serving uplink interference and the serving signal strength to the neighbor signal strength comprises comparing the serving uplink interference and the serving signal strength to neighbor uplink interference and the neighbor signal strength in response to a neighbor measurement object for the neighbor radio band at the neighbor cell.

9. The method of claim 1 wherein the UE circuitry comparing the serving uplink interference and the serving signal strength to the neighbor signal strength comprises comparing the serving uplink interference and the serving signal strength to neighbor uplink interference and the neighbor signal strength in response to a serving measurement object for the serving radio band at the serving cell and a neighbor measurement object for the neighbor radio band at the neighbor cell.

10. The method of claim 1 wherein the UE circuitry comparing the serving uplink interference and the serving signal strength to the neighbor signal strength comprises accelerating the handover when the serving uplink interference has increased and decelerating the handover when the serving uplink interference has decreased.

11. A wireless User Equipment (UE) to initiate a handover from a serving cell to a neighbor cell in a wireless communication network, the UE comprising:
a serving radio configured to wirelessly exchange data with the serving cell over a serving radio band, exchange the data with UE circuitry, wirelessly receive serving signaling that indicates serving uplink interference for the serving radio band at the serving cell, and transfer the serving signaling to the UE circuitry;
a neighbor radio configured to wirelessly receive neighbor signaling and transfer the neighbor signaling to the UE circuitry;
the UE circuitry configured to exchange the data with the serving radio, receive the serving signaling from the serving radio, receive the neighbor signaling from the neighbor radio, determine serving signal strength and the serving uplink interference for the serving radio band at the serving cell, determine neighbor signal strength for the neighbor radio band at the neighbor cell, compare the serving uplink interference and the serving signal strength to the neighbor signal strength, and in response, generate a handover request for the neighbor cell;
the serving radio configured to wirelessly transfer the handover request to the serving cell; and
the neighbor radio configured to wirelessly exchange additional data with the neighbor cell over the neighbor radio band.

12. The UE of claim 11 wherein:
the serving radio is configured to wirelessly receive a serving interference offset that indicates the serving uplink interference for the serving radio band at the serving cell; and
the UE circuitry is configured to combine the serving signal strength with the serving interference offset and compare the combination to the neighbor signal strength.

13. The UE of claim 11 wherein:
the neighbor radio is configured to receive a neighbor interference offset that indicates neighbor uplink interference for the neighbor radio band at the neighbor cell; and
the UE circuitry is configured to combine the neighbor signal strength with the neighbor interference offset and compare the combination to the serving uplink interference and the serving signal strength.

14. The UE of claim 11 wherein:
the serving radio is configured to wirelessly receive the serving signaling that indicates a serving interference offset that indicates the serving uplink interference for the serving radio band at the serving cell;
the neighbor radio is configured to wirelessly receive the neighbor signaling that indicates a neighbor interference offset that indicates neighbor uplink interference for the neighbor radio band at the neighbor cell; and
the UE circuitry is configured to combine the serving signal strength with the serving interference offset, combine the neighbor signal strength with the neighbor interference offset, and compare the combinations.

15. The UE of claim 11 wherein the UE circuitry is configured to apply a Fifth Generation New Radio (5GNR) A5-1 threshold to compare the serving uplink interference and the serving signal strength to the neighbor signal strength.

16. The UE of claim 11 wherein the UE circuitry is configured to apply a Long Term Evolution (LTE) A5-1 threshold to compare the serving uplink interference and the serving signal strength to the neighbor signal strength.

17. The UE of claim 11 wherein the UE circuitry is configured to compare the serving uplink interference and the serving signal strength to the neighbor signal strength in response to a serving measurement object for the serving radio band at the serving cell.

18. The UE of claim 11 wherein the UE circuitry is configured to compare the serving uplink interference and the serving signal strength to neighbor uplink interference and the neighbor signal strength in response to a neighbor measurement object for the neighbor radio band at the neighbor cell.

19. The UE of claim 11 wherein the UE circuitry is configured to compare the serving uplink interference and the serving signal strength to neighbor uplink interference and the neighbor signal strength in response to a serving measurement object for the serving radio band at the serving cell and a neighbor measurement object for the neighbor radio band at the neighbor cell.

20. The UE of claim 11 wherein the UE circuitry is configured to accelerate the handover when the serving uplink interference has increased and decelerate the handover when the serving uplink interference has decreased.

* * * * *